US008666639B2

(12) United States Patent
Saruwatari et al.

(10) Patent No.: US 8,666,639 B2

(45) Date of Patent: Mar. 4, 2014

(54) FUEL SUPPLY CONTROL APPARATUS FOR ENGINE, AND FUEL SUPPLY CONTROL METHOD THEREFOR

(75) Inventors: Masayuki Saruwatari, Isesaki (JP); Yuichi Toyama, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 524 days.

(21) Appl. No.: 13/044,950

(22) Filed: Mar. 10, 2011

(65) Prior Publication Data

US 2011/0231083 A1 Sep. 22, 2011

(30) Foreign Application Priority Data

Mar. 19, 2010 (JP) ................................ 2010-064245

(51) Int. Cl.

*F02D 41/22* (2006.01)
*F02D 45/00* (2006.01)
*G01M 15/00* (2006.01)

(52) U.S. Cl.

USPC .......................................................... 701/107

(58) Field of Classification Search

USPC ................. 701/107, 103–105, 102, 114, 115; 123/478, 480, 488, 479, 502; 73/114.17, 114.18, 114.41, 114.43

See application file for complete search history.

(56) References Cited

U.S. PATENT DOCUMENTS 6,647,769 B1 * 11/2003 Fujino et al. ............... 73/114.41
7,677,224 B2 3/2010 Inoue
8,347,863 B2 * 1/2013 Cwielong et al. ............. 123/511
2008/0230035 A1 9/2008 Inoue

FOREIGN PATENT DOCUMENTS

JP 2006-161675 A 6/2006
JP 2008-232099 A 10/2008

* cited by examiner

*Primary Examiner* — Hieu T Vo

(74) *Attorney, Agent, or Firm* — Foley & Lardner LLP

(57) ABSTRACT

The present invention relates to a fuel supply control apparatus and to a fuel supply control method, provided with an engine control unit and a fuel pump control unit. The engine control unit outputs an actuating signal for a fuel pump to the fuel pump control unit. The fuel pump control unit outputs a diagnostic signal indicating whether or not abnormality occurs in input of the actuating signal to the engine control unit. Furthermore, the engine control unit diagnoses whether or not abnormality occurs in input of the diagnostic signal and diagnoses based on the output signal from a fuel pressure sensor whether or not abnormality occurs in a control of fuel pressure. Then, the engine control unit performs a fail-safe function, based on whether or not the abnormality occurs in the input of the diagnostic signal, whether or not the abnormality occurs in the control of the fuel pressure, and whether or not the abnormality occurs in the input of the actuating signal in the fuel pump control unit.

20 Claims, 4 Drawing Sheets

FUEL SUPPLY CONTROL APPARATUS FOR ENGINE, AND FUEL SUPPLY CONTROL METHOD THEREFOR

BACKGROUND OF THE INVENTION

1. Field of the Invention

The present invention relates to a fuel supply control apparatus for an engine and to a fuel supply control method therefor, and, in particular, relates to a fail-safe technology against control system malfunctions inclusive of abnormalities in signal transmission and reception.

2. Description of Related Art

Japanese Laid-open (Kokai) Patent Application Publication No. 2006-161675 discloses a fuel supply control apparatus for feedback controlling a voltage for a fuel pump to maintain fuel pressure at a target value, in which it is diagnosed based on a correction value of the voltage by the feedback control whether fuel piping is clogged or fuel has leaked out from the fuel piping.

As a fuel supply control apparatus for an engine, there has been proposed an apparatus including: an engine control unit which controls a fuel injection valve of the engine; and a fuel pump control unit which controls a fuel pump for pumping fuel to the fuel injection valve, in which the engine control unit outputs an actuating signal for the fuel pump to the fuel pump control unit. In such a fuel supply control apparatus, if abnormality occurs in input of the actuating signal in the fuel pump control unit, a fuel pressure control is not normally performed. Therefore, it is preferable that a diagnostic signal indicating that the abnormality occurs in the input of the actuating signal be transmitted from the fuel pump control unit to the engine control unit, to thereby perform a fail-safe function in the engine control unit.

As the fail-safe function in the fuel supply control apparatus, the stopping of the fuel pump is performed or the stopping of injection by the fuel injection valve is performed. However, if an operation of the fuel pump or the fuel injection valve is stopped against control system malfunctions inclusive of abnormalities in signal transmission and reception between units, in the case of a vehicle engine, the vehicle running is likely not to be performed.

SUMMARY OF THE INVENTION

The present invention has been completed in view of the above problems, and has as an object to perform signal transmission and reception between a control system of a fuel injection valve and a control system of a fuel pump to thereby enable the vehicle running to be performed as much as possible against abnormality in an engine control apparatus for controlling fuel supply and an engine control method for controlling fuel supply.

Therefore, a fuel supply control apparatus according to the present invention includes: an engine control unit which controls a fuel injection valve; and a fuel pump control unit which controls a fuel pump, in which the engine control unit receives an output signal from a fuel pressure sensor and outputs an actuating signal for the fuel pump to the fuel pump control unit, and also, receives a diagnostic signal output from the fuel pump control unit;

the fuel pump control unit receives the actuating signal and outputs a manipulated variable of the fuel pump, and also, diagnoses whether or not abnormality occurs in input of the actuating signal, to output a signal indicating at least whether or not the abnormality occurs in the input of the actuating signal, as the diagnostic signal, to the engine control unit; and furthermore, the engine control unit diagnoses whether or not abnormality occurs in input of the diagnostic signal, diagnoses based on the output signal from the fuel pressure sensor whether or not abnormality occurs in a control of fuel pressure, judges based on the diagnostic signal whether or not the abnormality occurs in the input of the actuating signal in the fuel pump control unit, and performs a fail-safe function, based on whether or not the abnormality occurs in the input of the diagnostic signal, whether or not the abnormality occurs in the control of the fuel pressure, and furthermore, whether or not the abnormality occurs in the input of the actuating signal in the fuel pump control unit.

Furthermore, a fuel supply control method according to the present invention is for controlling an engine by the use of an engine control unit which controls a fuel injection valve and a fuel pump control unit which controls a fuel pump, in which an output signal from the fuel pressure sensor is input to the engine control unit;

an actuating signal for the fuel pump is computed by the engine control unit;

the actuating signal is output from the engine control unit to the fuel pump control unit;

a diagnostic signal output from the fuel pump control unit is input to the engine control unit;

the actuating signal is input to the fuel pump control unit;

a manipulated variable of the fuel pump is computed by the fuel pump control unit;

the manipulated variable is output from the fuel pump control unit to the fuel pump;

it is diagnosed by the fuel pump control unit whether or not abnormality occurs in input of the actuating signal;

the diagnostic signal indicating at least whether or not the abnormality occurs in the input of the actuating signal is output from the fuel pump control unit to the engine control unit;

it is diagnosed by the engine control unit whether or not abnormality occurs in input of the diagnostic signal;

it is diagnosed by the engine control unit, based on the output signal from the fuel pressure sensor, whether or not abnormality occurs in a control of fuel pressure;

it is judged by the engine control unit, based on the diagnostic signal, whether or not the abnormality occurs in the input of the actuating signal in the fuel pump control unit; and a fail-safe function is performed by the engine control unit, based on whether or not the abnormality occurs in the input of the diagnostic signal, whether or not the abnormality occurs in the control of the fuel pressure, and further, whether or not the abnormality occurs in the input of the actuating signal in the fuel pump control unit.

Other objects and features of the present invention will be understood from the following description with reference to the accompanying drawings.

DESCRIPTION OF PREFERRED EMBODIMENT

Figure 1:
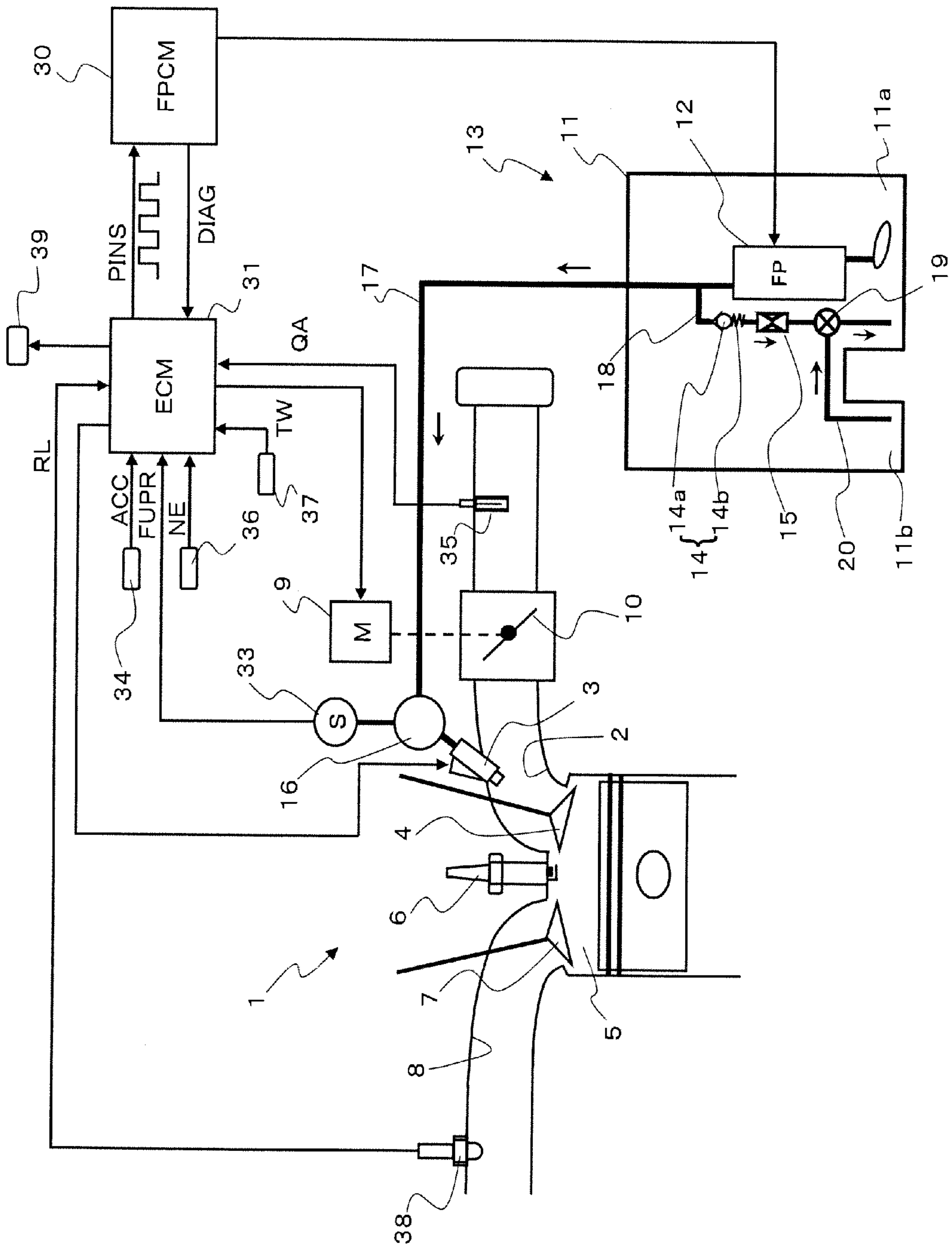
FIG. 1 is a systematic view illustrating a vehicular engine in an embodiment of the present invention.

FIG. 1 is a systematic view illustrating a vehicular engine including a fuel supply apparatus according to the present invention.

In FIG. 1, an engine 1 that is an internal combustion engine is provided with a fuel injection valve 3 in an intake passage 2.

In engine 1, fuel injected by fuel injection valve 3 is drawn together with air into a combustion chamber 5 via an intake valve 4, and the drawn fuel is combusted by spark ignition of an ignition plug 6. Furthermore, in engine 1, combusted gas in combustion chamber 5 is discharged to an exhaust passage 8 via an exhaust valve 7.

Furthermore, engine 1 is provided with an electronically controlled throttle 10 which is driven to open or close by a throttle motor 9, in intake passage 2 on the upstream side of fuel injection valve 3. Electronically controlled throttle 10 regulates an intake air amount of engine 1.

Furthermore, engine 1 is provided with a fuel supply system 13 which pumps fuel in a fuel tank 11 to fuel injection valve 3 by the use of a fuel pump 12.

Fuel supply system 13 includes fuel tank 11, fuel pump 12, a pressure regulating valve 14, an orifice 15, fuel gallery piping 16, fuel supply piping 17, fuel return piping 18, a jet pump 19 and a fuel transfer pipe 20.

Fuel pump 12 is an electrical pump of which the pump impeller is driven to rotate by the use of a motor.

Fuel supply piping 17 connects a discharge port of fuel pump 12 to fuel gallery piping 16. To fuel gallery piping 16, a fuel supply port of fuel injection valve 3 is connected.

Fuel return piping 18 is branched at one end thereof from fuel supply piping 17 in fuel tank 11 and the other end thereof opens into fuel tank 11.

To fuel return piping 18, pressure regulating valve 14, orifice 15 and jet pump 19 are disposed in this sequence from the upstream side.

Pressure regulating valve 14 is provided with a valve body 14*a* which opens or closes fuel return piping 18, and an elastic member 14*b*, such as a coil spring or the like, which presses valve body14*a* toward a valve seat on the upstream side of fuel return piping 18. Then, pressure regulating valve 14 is opened when pressure of the fuel to be supplied to fuel injection valve 3 exceeds minimum pressure FPMIN, while being closed when the fuel pressure is equal to or lower than the minimum pressure FPMIN.

As described above, pressure regulating valve 14 is opened when the pressure of the fuel to be supplied to fuel injection valve 3 is higher than the minimum pressure FPMIN. However, since orifice 15 disposed on the downstream side of pressure regulating valve 14 decreases a fuel flow amount to be returned into fuel tank 11 via fuel return piping 18, a discharge amount of the fuel from fuel pump 12 is increased to be larger than the returned fuel flow amount so that the fuel pressure can be increased up to pressure exceeding the minimum pressure FPMIN.

In other words, the discharge amount of fuel pump 12 is controlled on the basis of the minimum pressure FPMIN regulated by pressure regulating valve 14, so that the fuel pressure can be increased up to target fuel pressure (target fuel pressure≥FPMIN).

Incidentally, the fuel amount to be returned into fuel tank 11 via fuel return piping 18 may be decreased to an extent that the fuel pressure can be increased to exceed the minimum pressure FPMIN by controlling the discharge amount of fuel pump 12. Accordingly, in place of disposing orifice 15, pressure regulating valve 14 may be provided with a function of decreasing the fuel flow amount.

Jet pump 19 transfers the fuel via fuel transfer pipe 20 in accordance with the flow of fuel to be returned to fuel tank 11 via pressure regulating valve 14 and orifice 15.

In fuel tank 11, a portion of a bottom face thereof is raised upwards, so that a bottom space is partitioned into two regions 11*a* and 11*b*, and a suction port of fuel pump 12 opens into region 11*a*, and therefore, the fuel still remains in region 11*b* unless the fuel in region 11*b* is transferred to the side of region 11*a*.

Therefore, jet pump 19 makes negative pressure to act on the inside of fuel transfer pipe 20 by the fuel flow to be returned into region 11*a* of fuel tank 11 via pressure regulating valve 14 and orifice 15, and leads the fuel in region 11*b* to which fuel transfer pipe 20 opens, to jet pump 19 via fuel transfer pipe 20, to thereby discharge the fuel in region 11*b* into region 11*a* together with the fuel to be returned.

As an engine control unit (engine control means) which controls fuel injection by fuel injection valve 3, an ignition operation of ignition plug 6, opening of electronically controlled throttle 10 and the like, there is disposed a ECM (Engine Control Module) 31 provided with a microcomputer.

Furthermore, as a fuel pump control unit (Pump Control Means) which controls fuel pump 12, there is disposed a FPCM (Fuel Pump Control Module) 30 provided with a microcomputer.

ECM 31 and FPCM 30 are respectively provided with devices for mutually transmitting and receiving analog signals. Then, ECM 31 transmits, to FPCM 30, a square pulse signal PINS indicating a duty ratio and a frequency in a duty control of power supply to fuel pump 12, as an actuating signal.

Furthermore, FPCM 30 performs a diagnosis as to whether or not abnormality occurs in input of the pulse signal PINS, and transmits a diagnostic signal DIAG indicating a diagnosis result to ECM 31, as the square pulse signal.

ECM 31 receives detection signals from: a fuel pressure sensor 33 for detecting fuel pressure FUPR in fuel gallery piping 16; an accelerator opening sensor 34 for detecting a depression amount ACC of an accelerator pedal (not shown in the figure); an air flow sensor 35 for detecting an intake air flow amount QA of engine 1; a rotation sensor 36 for detecting a rotating speed NE of engine 1; a water temperature sensor 37 for detecting cooling water temperature TW of engine 1; an oxygen sensor 38 for detecting whether an air-fuel ratio of engine 1 is richer or leaner than a stoichiometric air-fuel ratio, and the like.

In addition, in place of oxygen sensor 38, an air-fuel ratio sensor capable of generating an output according to the air-fuel ratio to widely detect the air-fuel ratio may be disposed.

Then, ECM 31 computes a basic injection pulse width TP, based on the intake air flow amount QA and the engine rotating speed NE, and corrects the basic injection pulse width TP according to the fuel pressure FUPR at the time. Furthermore, ECM 31 computes an air-fuel ratio feedback correction coefficient LAMBDA for bringing an actual air-fuel ratio close to a target air-fuel ratio, based on an output of oxygen sensor 38, and further corrects the basic injection pulse width TP corrected according to the fuel pressure FUPR, based on the air-fuel ratio feedback correction coefficient LAMBDA, to thereby compute a final injection pulse with TI.

Then, ECM 31 outputs an injection pulse signal of the injection pulse width TI to fuel injection valve 3 at injection timing of each cylinder, to control a fuel injection amount by fuel injection valve 3 and the injection timing.

Furthermore, ECM 31 computes ignition timing based on the basic injection pulse width TP, the engine rotating speed NE and the like, which indicate a load of engine 1, to control power supply to an ignition coil (not shown in the figure) so that spark discharge of ignition plug 6 is performed at the computed ignition timing.

Furthermore, ECM 31 computes target opening of electronically controlled throttle 10 based on the accelerator opening ACC and the like, to control throttle motor 9 so that actual opening of electronically controlled throttle 10 is brought close to the target opening.

Furthermore, ECM 31 computes a duty ratio DUTY(%) of a duty control signal for controlling the power supply to fuel pump 12 and a frequency F(Hz) thereof, based on the fuel pressure FUPR detected by fuel pressure sensor 33 and operating conditions of engine 1. Then, ECM 31 transmits the square pulse signal PINS of a duty ratio DUTY1 and a frequency F1 corresponding to the duty ratio DUTY and the frequency F to FPCM 30, as the actuating signal for fuel pump 12.

Then, FPCM 30 computes the duty ratio DUTY and frequency F of the duty control signal which is a manipulated variable for controlling the power supply to fuel pump 12, based on the square pulse signal PINS received from the ECM 31 side, and outputs the computed duty control signal to a drive circuit of fuel pump 12, to thereby control a drive voltage for fuel pump 12.

ECM 31 and FPCM 30 described above form a fuel supply control apparatus.

In the following, a fuel pump controlling function of ECM 31 and a fuel pump controlling function of FPCM 30 will be described respectively, in detail.

Figure 2:
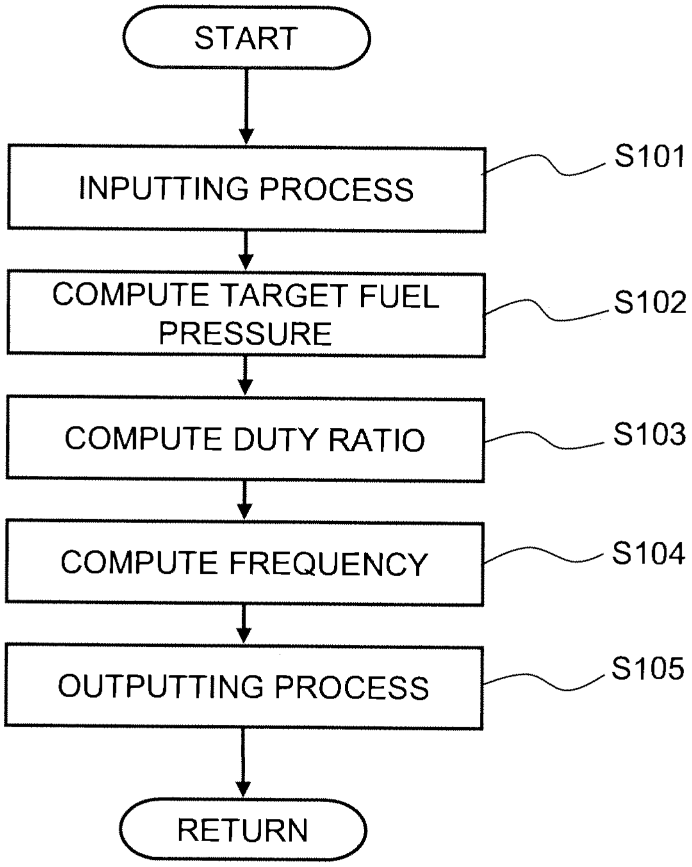
FIG. 2 is a flowchart illustrating a pump controlling process in an engine control module in an embodiment of the present invention.

A routine in a flowchart of FIG. 2 illustrates the fuel pump controlling function in ECM 31, and is executed at each fixed time by ECM 31.

Firstly, in step S101, in addition to the detection signal from fuel pressure sensor 33, the detection signals from the various types of sensors are input.

In next step S102, the operating conditions of engine 1 are detected based on the sensor signals which are input in step S101, and target fuel pressure TGFUPR is calculated according to the detected engine operating conditions.

ECM 31 sets the target fuel pressure TGFUPR to be higher, as the engine rotating speed NE is higher and the engine load is higher. Furthermore, during the starting of engine, when the water temperature is high, ECM 31 sets the target fuel pressure TGFUPR to be higher than that for when the water temperature is low.

In step S103, the duty ratio DUTY(%) is calculated so that the fuel pressure FUPR detected by fuel pressure sensor 38 is brought close to the target fuel pressure TGFUPR.

Furthermore, in step S104, the frequency F(Hz) in the duty control of the power supply to fuel pump 12 is calculated.

The frequency F may be set at a fixed value, or may be set to be higher as the duty ratio DUTY is smaller, as disclosed in Japanese Laid-open (Kokai) Patent Application Publication No. 2008-232099, for example.

In step S105, the duty ratio DUTY1 and frequency F1 of the pulse signal PINS for indicating the duty ratio DUTY and the frequency F to FPCM 30 are determined based on the duty ratio DUTY and the frequency F, and the determined square pulse signal PINS is transmitted to FPCM 30.

To be specific, the duty ratio DUTY in a variable range 0% to 100% is converted into the duty ratio DUTY1 in a narrower range except for 0% and 100%, for example, a range of 20% to 80%, based on previously stored conversion characteristics, and the duty ratio DUTY1 after converting is set as the duty ratio of the pulse signal PINS.

Furthermore, the frequency F is converted into the lower frequency F1 based on previously stored conversion characteristics, and the frequency F1 after converting is set as the frequency of the pulse signal PINS.

Then, the pulse signal PINS of the duty ratio DUTY1 obtained by converting the duty ratio DUTY and of the frequency F1 obtained by converting the frequency F, is output to FPCM 30, as the actuating signal indicating the duty ratio DUTY and the frequency F.

Figure 3:
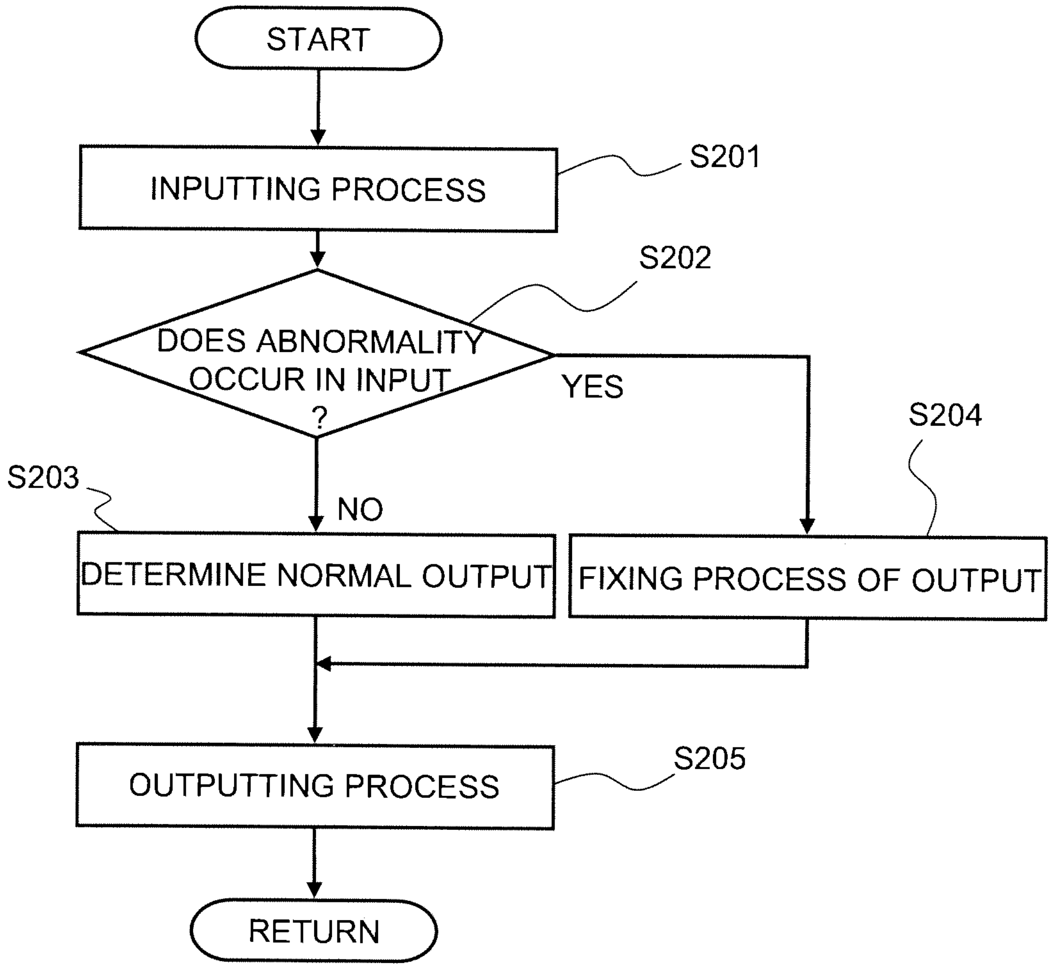
FIG. 3 is a flowchart illustrating a pump controlling process in a fuel pump control module in an embodiment of the present invention.

A routine in a flowchart of FIG. 3 illustrates the fuel pump controlling function in FPCM 30, and is executed by FPCM 30 at each input of the pulse signal PINS.

First, in step S201, the analog pulse signal PINS transmitted from ECM 31 is A/D converted to be read in, to thereby be digitized.

Then, an ON time of the digitized pulse signal PINS and a cycle thereof are computed, and the duty ratio DUTY1(%) of the pulse signal PINS is computed based on the computed cycle and the computed ON time, and furthermore, the cycle of the pulse signal PINS is converted into the frequency F1.

If the duty ratio DUTY1 of the pulse signal PINS is not within a normal range, it is possible to estimate that an abnormality has occurred in the input of the pulse signal PINS, due to occurrence of abnormality, such as superimposition of noise on the pulse signal PINS, a failure in an input-output circuit of the pulse signal PINS, a failure in a transmission line of the pulse signal PINS or the like.

Furthermore, if the case in which the frequency F of the pulse signal PINS is deviated from the frequency F1 set by ECM 31, it is also possible to estimate that the abnormality occurs in the input of the pulse signal PINS, due to the occurrence of abnormality, such as, the superimposition of noise on the pulse signal PINS, the failure in the input-output circuit of the pulse signal PINS, the failure in the transmission line of the pulse signal PINS or the like.

Therefore, in step S202, it is diagnosed as described above whether the duty ratio DUTY1 of the pulse signal PINS and the frequency F1 thereof are normal or abnormal.

Then, if both of the duty ratio DUTY1 of the pulse signal PINS and the frequency F1 thereof are normal, the routine proceeds to step S203, in which a process is performed for converting the duty ratio DUTY1 of the pulse signal PINS and the frequency F1 thereof into the duty ratio DUTY and the frequency F in the duty control of the power supply to fuel pump 12.

FPCM 30 previously stores conversion characteristics which are opposite to the conversion characteristics of converting the duty ratio DUTY of the pulse signal PINS into the duty ratio DUTY1 thereof in ECM 31, and based on such conversion characteristics, performs a process of converting the duty ratio DUTY1 of the pulse signal PINS into the duty ratio DUTY thereof.

Furthermore, FPCM 30 previously stores conversion characteristics which are opposite to the conversion characteristics of converting the frequency F of the pulse signal PINS into the frequency F1 thereof in ECM 31, and based on such conversion characteristics, performs a process of converting the frequency F1 of the pulse signal PINS into the frequency F thereof.

If the duty ratio DUTY and the frequency F are obtained in step S203, and then, the routine proceeds to step S205, in which a switching signal of the duty ratio DUTY and the frequency F are output to a pump drive circuit disposed separately from FPCM 30, and the power supply to fuel pump 12 is duty controlled. Incidentally, in the case in which FPCM 30 incorporates the pump drive circuit therein, a voltage obtained by driving a switching element based on the signal of duty ratio DUTY and the frequency F is applied to fuel pump 12.

On the other hand, in step S202, if it is diagnosed that at least one of the duty ratio DUTY1 of the pulse signal PINS and the frequency F1 thereof are abnormal, that is, if it is diagnosed that the abnormality occurs in the input of the pulse signal PINS, the routine proceeds to step S204.

In step S204, a process of constantly fixing the duty ratio DUTY and the frequency F is performed, and also, the diagnostic signal DIAG indicating that the abnormality occurs in the input of the pulse signal PINS is output.

In a fail-safe function of constantly fixing the duty ratio DUTY and the frequency F, if a duration time of an abnormal state is within a limit time, the duty ratio and the frequency are fixed at the duty ratio DUTY and the frequency F obtained by converting the duty ratio DUTY1 and frequency F1 of the pulse signal PINS just before the abnormality occurrence. On the other hand, if the duration time of abnormal state exceeds the limit time, the duty ratio and the frequency are fixed at a duty ratio DUTYF and a frequency FF for the previously stored fail-safe function.

The above-mentioned time limit is matched with a time at which the fuel pressure deficiency does not occur, even if the duty ratio and the frequency are fixed at the duty ratio DUTY and the frequency F before the abnormality occurrence. Furthermore, as described later, the duty ratio DUTYF and the frequency FF for the fail-safe function are previously adjusted, so as to ensure requisite minimum fuel pressure over an entire region of low to medium load and low to medium rotation except for a high load and high rotation region in which the engine operations are inhibited.

That is, in a state in which the abnormality occurs in the input of the pulse signal PINS, FPCM 30 may not control fuel pump 12 in accordance with the actuating signal from ECM 31, and therefore, FPCM 30 fixes a drive signal for fuel pump 12 based on the previously stored duty ratio DUTYF and the frequency FF for the fail-safe function. Furthermore, ECM 31 estimates that FPCM 30 drives fuel pump 12 based on the duty ratio DUTYF and the frequency FF for the fail-safe function, to inhibit the operations of engine 1 in the high load-high rotation region.

The duty ratio DUTYF and the frequency FF for the fail-safe function each may be fixed at a single value, or may be varied according to a change of engine load and a change of engine rotating speed, by referring to a map which previously stores the duty ratio DUTYF and the frequency FF for the fail-safe function according to the engine load and the engine rotating speed.

In the case in which the duty ratio DUTYF and the frequency FF for the fail-safe function are variably set according to the engine load and the engine rotating speed, it is preferable that the duty ratio DUTYF be set to be larger on the high load-high rotation side, whereas the frequency FF is set to be higher as the duty ratio DUTYF is smaller.

In the case in which the duty ratio DUTYF is fixed at the single value, the fuel pressure is excessively high on the low load-low rotation side, whereas the fuel pressure is deficient on the high load-low rotation side. Therefore, the engine operations in the high load-high rotation region are inhibited to thereby limit the operation region, so that excess or deficiency of the fuel pressure becomes sufficiently small even if the duty ratio DUTYF is fixed at one point.

Figure 4:
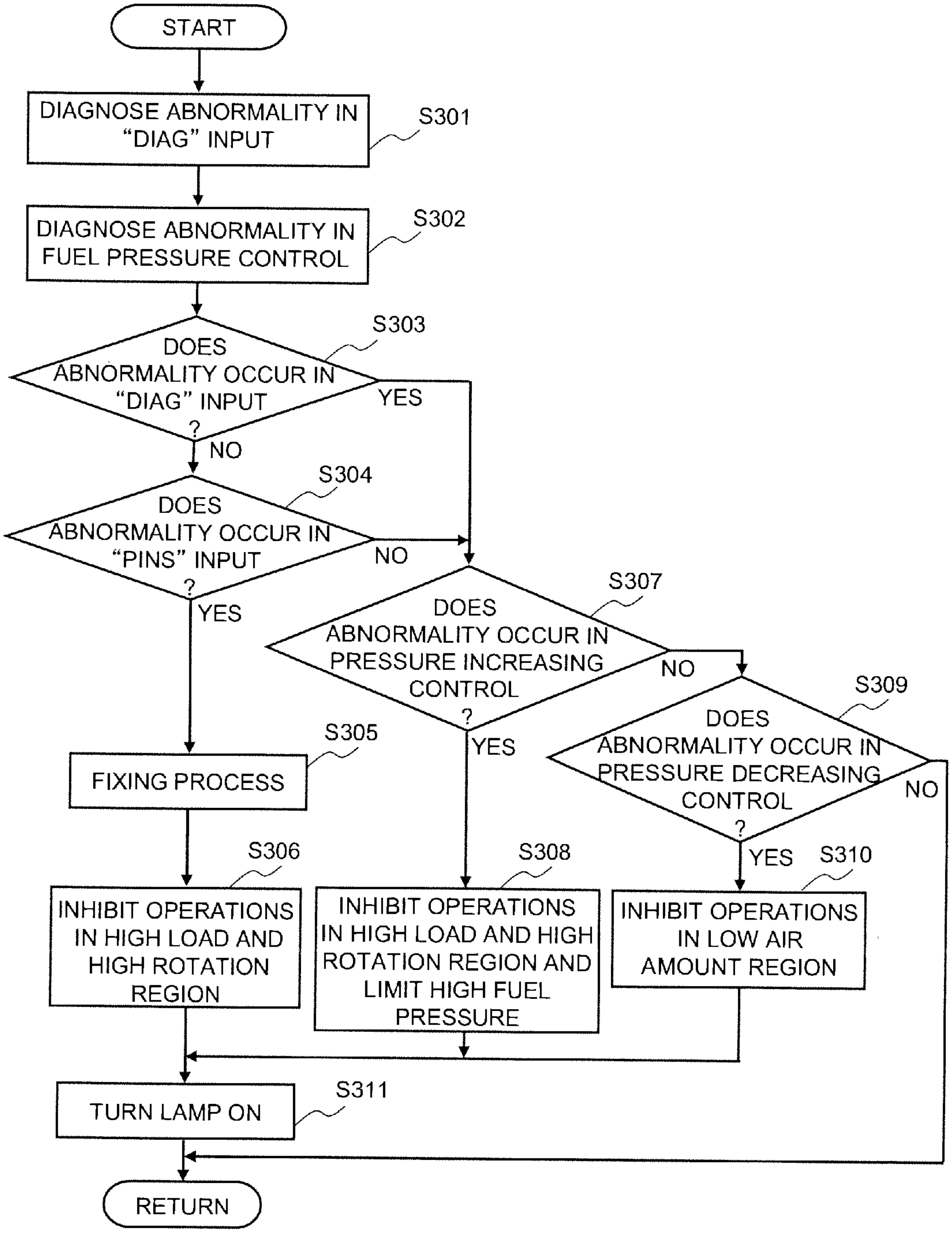
FIG. 4 is a flowchart illustrating a fail-safe controlling process in an engine control module in an embodiment of the present invention.

A flowchart of FIG. 4 illustrates the fail-safe function executed by ECM 31.

A routine in the flowchart of FIG. 4 is executed at each fixed time by ECM 31, and first, in step S301, it is diagnosed whether or not an abnormality occurs in input of the diagnostic signal DIAG output from FPCM 30.

FPCM 30 outputs the diagnostic signal DIAG as the square pulse signal of output waveform according to the diagnosis result, and also, limits a variable range of a duty ratio DUTYD of the diagnostic signal DIAG to a narrow range except for 0% and 100%, for example, 20%<DUTYD<80%.

Accordingly, if the diagnostic signal DIAG is received as a signal of the duty ratio DUTYD outside the variable range, it is possible to judge that the abnormality occurs in the input of the diagnostic signal DIAG, due to superimposition of noise on the diagnostic signal DIAG, a failure in an input-output circuit of the diagnostic signal DIAG, a failure in a transmission line of the diagnostic signal DIAG or the like.

Furthermore, if the case in which the frequency of the diagnostic signal DIAG is deviated from a set value, it is also possible to estimate that the abnormality occurs in the input of the pulse signal PINS, due to the occurrence of abnormality, such as, the superimposition of noise on the diagnostic signal DIAG, the failure in the input-output circuit of the diagnostic signal DIAG, the failure in the transmission line of the diagnostic signal DIAG or the like.

Therefore, ECM 31 judges that the abnormality occurs in the input of the diagnostic signal DIAG, when at least one of the duty ratio DUTYD of the diagnostic signal DIAG and a frequency FD thereof are outside a normal range. If both of the duty ratio DUTYD and the frequency FD are within the normal range, ECM 31 judges that the diagnostic signal DIAG is normally input.

Incidentally, FPCM 30 diagnoses a malfunction of the microcomputer incorporated in FPCM 30, heating abnormality in FPCM 30 and the like, in addition to the abnormality in the input of the pulse signal PINS, to output the diagnostic signal DIAG by allocating different duty ratios DUTYD according to types of abnormalities.

Then, ECM 31 measures the duty ratio DUTYD of the diagnostic signal DIAG to judge whether a measurement result represents the duty ratio corresponding to a normal condition of FPCM 30 or the duty ratio indicating any one of abnormalities, to thereby detect a diagnosis result on the side of FPCM 30.

In next step S302, it is diagnosed based on the fuel pressure detected by fuel pressure sensor 33 whether or not abnormality occurs in a fuel pressure control.

If the fuel pressure control is normally performed, since the voltage for fuel pump 12 is controlled so that the fuel pressure detected by fuel pressure sensor 33 is brought close to the target fuel pressure TGFUPR, the fuel pressure is changed to follow the target fuel pressure TGFUPR.

Contrary to the above, if the fuel pressure may not be increased up to the target fuel pressure TGFUPR even if the voltage is increased in a state in which the fuel pressure is lower than the target fuel pressure TGFUPR, it is possible to judge that the fuel pressure may not be increased up to the target fuel pressure TGFUPR due to a decrease of discharge flow amount of fuel pump 12, clogging of fuel piping or the like, that is, abnormality occurs in a pressure increasing control.

Furthermore, if a pressure decreasing response until the target fuel pressure for when the discharge flow amount of fuel pump 12 is decreased in a state in which the fuel pressure is higher than the target fuel pressure TGFUPR, becomes slower than that in an initial state, it is possible to judge that the pressure decreasing is delayed due to the fixing of pressure regulating valve 14 in a closed state, that is, abnormality occurs in a pressure decreasing control.

As described in the above, in the present embodiment, ECM 31 compares the actual fuel pressure detected by fuel pressure sensor 33 with the target fuel pressure TGFUPR, to diagnose the abnormality in the pressure increasing control and the abnormality in the pressure decreasing control as the abnormality in the fuel pressure control.

In step S303, it is judged whether the input of the diagnostic signal DIAG is normally performed or the abnormality occurs in the input of the diagnostic signal DIAG.

If the input of the diagnostic signal DIAG is normally performed, the routine proceeds to step S304, in which the duty ratio DUTYD of the input diagnostic signal DIAG is discriminated, to thereby judge whether or not the abnormality occurs in the input of the pulse signal PINS in FPCM 30.

Then, if the abnormality occurs in the input of the pulse signal PINS in FPCM 30, the routine proceeds to step S305, in which a process of constantly fixing the duty ratio DUTY and the frequency F which are to be indicated to FPCM 30 is performed.

In the process in step S305, the duty ratio DUTY and the frequency F each may be fixed at a single value, or may be variably set by referring to a map which previously stores the duty ratio DUTY and the frequency F according to the engine load and the engine rotating speed. In the case in which the duty ratio DUTY and the frequency F are variably set according to the engine load and the engine rotating speed, it is preferable that the duty ratio DUTY is set to be larger on the high load-high rotation side, whereas the frequency F is set to be higher as the duty ratio DUTY is smaller.

In next step S306, as the fail-safe function, the process of inhibiting the operations of engine 1 in the high load-high rotation region and the process of operating engine 1 in the low-medium load and low-medium rotation region are performed.

The process of inhibiting the operations in the high load-high rotation region corresponds to a process of limiting maximum opening of electronically controlled throttle 10 to be equal to or less than full opening, a process of inhibiting the fuel injection by fuel injection valve 3 when the engine rotating speed exceeds a threshold, and the like.

As described in the above, FPCM 30 constantly fixes the duty ratio DUTY when the abnormality occurs in the input of the pulse signal PINS, and therefore, the fuel injection is performed in the low-medium load and low-medium rotation region in the state in which the duty ratio DUTY is constantly fixed.

In other words, in the case in which a driving duty (drive voltage) for fuel pump 12 is constantly fixed, if requisite lower limit fuel pressure is to be ensured even on the high load-high rotation side, since the fuel pressure becomes excessive on the low load-low rotation side, the driving duty (drive voltage) is fixed so as to avoid the excessive fuel pressure on the low load-low rotation side, and thus, the high load-high rotation region in which the fuel pressure is deficient is set as an operations inhibited region.

In the above described fail-safe function to the abnormality in the input of the pulse signal PINS, although the operations of engine 1 in the high load-high rotation region are inhibited, the operations can be consecutively performed in the low-medium load and low-medium rotation region which is a normal operation region, and therefore, it is possible to run a vehicle.

If the fail-safe function to the abnormality in the input of the pulse signal PINS is executed, the routine proceeds to step S311, in which a lamp 39 as a warning device is turned on to thereby warn a driver about occurrence of malfunction in a fuel supply control system.

On the other hand, if it is judged in step S303 that the abnormality occurs in the input of the diagnostic signal DIAG and if it is judged in step S304 that the input of the pulse signal PINS is normally performed, the routine proceeds to step S307, in which it is judged whether or not the abnormality occurs in the pressure increasing control.

If the abnormality occurs in the pressure increasing control due to the decrease of discharge flow amount of fuel pump 12 or the clogging of fuel piping, it is judged that the high fuel pressure required in the high load-high rotation region may not be achieved, and the routine proceeds to step S308. In step S308, similarly to step S306, the fail-safe function of inhibiting the operations in the high load-high rotation region is performed, and also, the fail-safe function of decreasing the maximum fuel pressure to be lower than normal is performed, and thereafter, the routine proceeds to step S311, in which lamp 39 is turned on.

That is, in the case in which the operations in the high load-high rotation region are inhibited, the high fuel pressure adapted to the high load-high rotation region is unnecessary. Therefore, a maximum value of the target fuel pressure TGFUPR in the low-medium load and low-medium rotation region in which the operations of engine 1 are consecutively performed, is set as an upper limit value, and the target fuel pressure TGFUPR is limited to be equal to or lower than the upper limit value. Then, the duty ratio DUTY (drive voltage) is set based on the target fuel pressure TGFUPR limited to be equal to or lower than the upper limit value, and the pulse signal PINS indicating the set duty ratio DUTY is output to FPCM 30.

However, in the case in which the operations of engine 1 in the high load-high rotation region are inhibited by limiting the maximum opening of electronically controlled throttle 10 to be lower than the full opening, since the engine load is suppressed to be lower, the target fuel pressure TGFUPR is set according to the engine load and the engine rotating speed, and as a result, the maximum fuel pressure is suppressed to be lower. Consequently, the fail-safe function of suppressing the fuel pressure to be lower can be omitted.

Incidentally, even in the case in which FPCM 30 diagnoses that the abnormality occurs in the input of the pulse signal PINS and fixes the manipulated variable of fuel pump 12, if the abnormality occurs in the input of the diagnostic signal DIAG, ECM 31 changes the duty ratio DUTY of the pulse signal PINS so as to normally bring the actual fuel pressure close to the target fuel pressure TGFUPR.

However, FPCM 30 fixes the manipulated variable since the pulse signal PINS may not be normally received, and therefore, the fuel pressure detected by fuel pressure sensor 33 does not respond to the fuel pressure increasing indication output by ECM 31, and consequently, ECM 31 judges the abnormality in the pressure increasing control.

Accordingly, in the case in which both the abnormality in the input of the pulse signal PINS in FPCM 30 and the abnormality in the input of the diagnostic signal DIAG in ECM 31 occur simultaneously, the routine proceeds to step S307 and step S308. Then, ECM 31 inhibits the operations in the high load-high rotation region whereas FPCM 30 performs the fail-safe function of fixing the manipulated variable. Even in the state in which the above described fail-safe functions are performed, the operations of engine 1 in the low-medium load and low-medium rotation region which is the normal operation region can be directly performed in consecutive.

On the other hand, if it is judged in step S307 that the pressure increasing control is normally performed, the routine proceeds to step S309, in which it is judged whether the pressure decreasing control is performed normally or abnormally.

If pressure regulating valve 14 is normally driven, the fuel pressure is decreased by the fuel amount injected by fuel injection valve 3 and the fuel amount relieved via pressure regulating valve 14. On the other hand, if pressure regulating valve 14 is fixed in the closed state, the fuel is not relieved via pressure regulating valve 14, so that a decreasing speed of the fuel pressure is reduced.

At the time of such abnormality in the pressure decreasing control, the routine proceeds to step S310, in which the fail-safe function of inhibiting the operations of engine 1 in a low air amount region is performed, and thereafter, the routine proceeds to step S311, in which lamp 39 is turned on.

In the fail-safe function of inhibiting the operations in the low air amount region, minimum opening of electronically controlled throttle 10 is limited to be larger than normal or an external load, such as an air-conditioner compressor driven by engine 1, is forcibly turned on, so that the intake air amount of engine 1 is increased by an amount corresponding to the external load.

In the state in which pressure regulating valve 14 is fixed in the closed state, that is, in the state in which the abnormality occurs in the pressure decreasing control, as a result that the fuel pressure is hard to be decreased, the fuel pressure tends to be higher than the target fuel pressure TGFUPR. Then, if the injection amount per unit time is increased due to the high fuel pressure, it is necessary to narrow the injection pulse width by the increased injection amount. However, if the injection pulse width is further narrowed in the low air amount region in which the intake air amount is small and the injection pulse width is narrow, gauging precision of the fuel in the fuel injection valve is degraded to lead variations in the air-fuel ratio, so that combustion stability of engine 1 is decreased.

Therefore, in the state in which the abnormality occurs in the pressure decreasing control, a minimum value of the intake air amount of engine 1 is set to be larger than normal so that the fuel injection is performed in the injection pulse width equal to or wider than a minimum pulse width capable of ensuring the gauging precision of the fuel.

As described in the above, if the operations in the low air amount region are inhibited in response to the abnormality in the pressure decreasing control, although fuel consumption performance is reduced, the gauging precision of the fuel can be ensured, and thus, the variations in the air-fuel ratio can be suppressed, and therefore, the combustion stability of engine 1 can be maintained.

On the other hand, if it is judged in step S309 that the pressure decreasing control is normally performed, the present routine bypasses step S311 to be terminated.

Accordingly, even in the case in which it is judged in step S303 that the abnormality occurs in the input of the diagnostic signal DIAG, if it is judged in step S307 that the pressure increasing control is normally performed, and also, if it is judged in step S309 that the pressure decreasing control is normally performed, the present routine is terminated without executing the fail-safe function.

In the case in which the abnormality occurs in the input of the diagnostic signal DIAG, although the diagnosis result in FPCM 30 may not be detected by ECM 31, even if the diagnosis result in FPCM 30 is undefined, if the fuel pressure control is normally performed, it is possible to estimate that the abnormality does not occur in the input of the pulse signal PINS in FPCM 30.

Accordingly, even in the case in which the abnormality occurs in the input of the diagnostic signal DIAG, if it is diagnosed that the fuel pressure control is normally performed, the fail-safe function does not need to be executed. Therefore, in the above embodiment, in the case in which the fuel pressure control is normally performed even though the abnormality occurs in the input of the diagnostic signal DIAG, the fail-safe function is not executed, but the fuel pressure control in ECM 31 is normally performed, and also, the operation region of engine 1 is not limited.

Incidentally, also in the case in which it is judged in step S309 that the abnormality occurs in the input of the diagnostic signal DIAG, and it is judged in step S307 that the pressure increasing control is normally performed, and also, it is judged in step S309 that the pressure decreasing control is normally performed, that is, also in the case in which only the abnormality in the input of the diagnostic signal DIAG occurs, the routine may proceed to step S311, in which lamp 39 is turned on for warning the driver about the occurrence of malfunction in the fuel supply control system, to persuade the driver to do repairs.

According to the above described embodiment, the fail-safe function to be executed is selected, based on whether or not the abnormality occurs in the input of the diagnostic signal DIAG, whether or not the fuel pressure is normally controlled, and whether or not the abnormality occurs in the input of the pulse signal PINS, and therefore, it is possible to maintain the vehicle in a running state by operating engine 1 normally as much as possible.

For example, if FPCM 30 stops the driving of fuel pump 12 based on the abnormality in the input of the pulse signal PINS, and ECM 31 outputs the pulse signal PINS for stopping the driving of fuel pump 12 to FPCM 30 in response to at least one of the input abnormality in the diagnostic signal DIAG and the abnormality in the fuel pressure control, the operations of engine 1 are stopped, so that the running of the vehicle is impossible.

In contrast to the above, in the above-described embodiment, the operation region of engine 1 may be limited, but the operations of engine 1 can be consecutively performed, so that the vehicle can be maintained in the running state.

Incidentally, in the case in which the operation region of engine 1 is limited as the fail-safe function, a boundary between the region in which the operations are inhibited according to the engine temperature and the region in which the operations are permitted may be changed. For example, in the case in which the operations in the high load-high rotation region are inhibited, even in the same load-rotation conditions, the region in which the fuel amount is increased and the injection amount can be ensured, is narrowed when the engine is cooled down, and therefore, the high load-high rotation region in which the operations are inhibited may be expanded when the engine is cooled down.

Furthermore, the fuel supply apparatus in the above-described embodiment is provided with pressure regulating valve 14, but may be such an apparatus which is not provided with pressure regulating valve 14. In such a case, the diagnosis of the pressure decreasing control and the operation limitation in the low air amount region for when the abnormality occurs in the pressure decreasing control, may be omitted.

Furthermore, it is possible to install the fuel pump control function of FPCM 30 and the diagnosis function thereof in ECM 31, to thereby configure the fuel supply control apparatus by ECM 31 as a single body. In this case, it is possible to make a first microcomputer to have the engine controlling function and to make a second microcomputer separate from the first microcomputer to have the fuel pump controlling function.

Still further, it is possible to contain, in the abnormality in the input of the diagnostic signal DIAG, a malfunction in a diagnosis computing device and a malfunction in a communication line between units, in addition to the abnormalities described in the above embodiment.

The entire contents of Japanese Patent Application No. 2010-064245 filed on Mar. 19, 2010, on which priority is claimed, are incorporated herein by reference.

While only selected embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention as defined by the appended claims and their equivalents.

What is claimed is:

1. A fuel supply control apparatus for an engine provided with a fuel injection valve, a fuel pump for pumping fuel to the fuel injection valve and a fuel pressure sensor for detecting pressure of the fuel sent to the fuel injection valve, comprising:

an engine control unit which controls the fuel injection valve; and a fuel pump control unit which controls the fuel pump, wherein the engine control unit receives an output signal from the fuel pressure sensor and outputs an actuating signal for the fuel pump to the fuel pump control unit, and receives a diagnostic signal output from the fuel pump control unit;

the fuel pump control unit receives the actuating signal and outputs a manipulated variable of the fuel pump, and diagnoses whether or not abnormality occurs in input of the actuating signal, to output a signal indicating at least whether or not the abnormality occurs in the input of the actuating signal, as the diagnostic signal, to the engine control unit; and the engine control unit diagnoses whether or not abnormality occurs in input of the diagnostic signal, diagnoses based on the output signal from the fuel pressure sensor whether or not abnormality occurs in a control of the fuel pressure, judges based on the diagnostic signal whether or not the abnormality occurs in the input of the actuating signal in the fuel pump control unit, and performs a fail-safe function, based on whether or not the abnormality occurs in the input of the diagnostic signal, whether or not the abnormality occurs in the control of the fuel pressure, and further, whether or not the abnormality occurs in the input of the actuating signal in the fuel pump control unit.

2. The apparatus according to claim 1, wherein the fuel pump control unit constantly fixes the manipulated variable when it is judged that the abnormality occurs in the input of the actuating signal.

3. The apparatus according to claim 1, wherein the engine control unit inhibits engine operations in a high load-high rotation region, as the fail-safe function, when it is diagnosed that the input of the diagnostic signal is normally performed and it is judged that the abnormality occurs in the input of the actuating signal in the fuel pump control unit.

4. The apparatus according to claim 1, wherein the engine control unit inhibits engine operations in a high load-high rotation region, and controls the fuel pressure in a region lower than normal by setting the actuating signal, as the fail-safe function, when it is diagnosed that abnormality occurs in a pressure increasing control, as the abnormality in the fuel pressure control.

5. The apparatus according to claim 4, wherein the engine control unit judges at least one of reduction of a discharge flow amount from the fuel pump and clogging of fuel piping connecting the fuel injection valve to the fuel pump, when it is diagnosed that the abnormality occurs in the pressure increasing control.

6. The apparatus according to claim 1, wherein the engine control unit inhibits engine operations in a low air amount region, as the fail-safe function, when it is diagnosed that abnormality occurs in a pressure decreasing control, as the abnormality in the fuel pressure control.

7. The apparatus according to claim 6, further comprising;

a pressure regulating valve which is driven to open when the pressure of the fuel in fuel piping connecting the fuel injection valve to the fuel pump exceeds a threshold, to relieve the fuel discharged from the fuel pump into a fuel tank, wherein the engine control unit judges that the pressure regulating valve is fixed in a closed state, when it is diagnosed that the abnormality occurs in the pressure decreasing control.

8. The apparatus according to claim 1, wherein the engine control unit normally outputs the actuating signal to the fuel pump control unit and normally controls the engine, when it is diagnosed that the abnormality occurs in the input of the diagnostic signal, and it is diagnosed that the fuel pressure control is normally performed.

9. The apparatus according to claim 1, wherein the actuating signal output from the engine control unit towards the fuel pump control unit, and the diagnostic signal output from the fuel pump control unit towards the engine control unit, are square pulse signals of duty ratios within a medium region except for at least 0% and 100%, the diagnosis by the engine control unit as to whether or not the abnormality occurs in the input of the diagnostic signal, and the diagnosis by the fuel pump control unit as to whether or not the abnormality occurs in the input of the actuating signal, are performed based on the duty ratios of the square pulse signals and frequencies thereof.

10. The apparatus according to claim 1, wherein the engine control unit actuates a warning device when the fail-safe function is executed.

11. The apparatus according to claim 1, wherein the fail-safe function executed by the engine control unit includes a process of inhibiting engine operations in a high load-high rotation region, and the engine control unit limits maximum opening of a throttle valve of the engine to be lower than maximum opening at a normal operation time, to thereby inhibit the engine operations in the high load-high rotation region.

12. The apparatus according to claim 1, wherein the engine control unit: inhibits engine operations in a high load-high rotation region, as the fail-safe function, when it is diagnosed that the input of the diagnostic signal is normally performed, and it is judged that the abnormality occurs in the input of the actuating signal in the fuel pump control unit;

inhibits the engine operations in the high load-high rotation region, as the fail-safe function, and controls the fuel pressure in a region lower than normal by setting the actuating signal, when it is diagnosed that abnormality occurs in a pressure increasing control, as the abnormality in the fuel pressure control;

inhibits the engine operations in a low air amount region, as the fail-safe function, when it is diagnosed that abnormality occurs in a pressure decreasing control, as the abnormality in the fuel pressure control; and outputs normally the actuating signal to the fuel pump control unit, to thereby normally control the engine, when it is diagnosed that the abnormality occurs in the input of the diagnostic signal, and it is diagnosed that the fuel pressure control is normally performed.

13. A fuel supply control apparatus which is applied to an engine provided with a fuel injection valve, a fuel pump for pumping fuel to the fuel injection valve and a fuel pressure sensor for detecting pressure of the fuel sent to the fuel injection valve, comprising:

engine control means for controlling the fuel injection valve; and fuel pump control means for controlling the fuel pump, wherein the engine control means receives an output signal from the fuel pressure sensor and outputs an actuating signal for the fuel pump to the fuel pump control means, and receives a diagnostic signal output from the fuel pump control means;

the fuel pump control means receives the actuating signal and outputs a manipulated variable of the fuel pump, and diagnoses whether or not abnormality occurs in input of the actuating signal, to output a signal indicating at least whether or not the abnormality occurs in the input of the actuating signal, as the diagnostic signal, to the engine control means; and the engine control means diagnoses whether or not abnormality occurs in input of the diagnostic signal, diagnoses based on the output signal from the fuel pressure sensor whether or not abnormality occurs in a control of the fuel pressure, judges based on the diagnostic signal whether or not the abnormality occurs in the input of the actuating signal in the fuel pump control means, and performs a fail-safe function, based on whether or not the abnormality occurs in the input of the diagnostic signal, whether or not the abnormality occurs in the control of the fuel pressure, and further, whether or not the abnormality occurs in the input of the actuating signal in the fuel pump control means.

14. A fuel supply control method of controlling an engine provided with a fuel injection valve, a fuel pump for pumping fuel to the fuel injection valve and a fuel pressure sensor for detecting pressure of the fuel sent to the fuel injection valve, by the use of an engine control unit which controls the fuel injection valve and a fuel pump control unit which controls the fuel pump, comprising the steps of:

inputting an output signal from the fuel pressure sensor to the engine control unit;

computing by the engine control unit an actuating signal for the fuel pump;

outputting by the engine control unit the actuating signal to the fuel pump control unit;

inputting a diagnostic signal output from the fuel pump control unit to the engine control unit;

inputting the actuating signal to the fuel pump control unit;

computing by the fuel pump control unit a manipulated variable of the fuel pump;

outputting by the fuel pump control unit the manipulated variable to the fuel pump;

diagnosing by the fuel pump control unit whether or not abnormality occurs in input of the actuating signal;

outputting by the fuel pump control unit the diagnostic signal indicating at least whether or not the abnormality occurs in the input of the actuating signal to the engine control unit;

diagnosing by the engine control unit whether or not abnormality occurs in input of the diagnostic signal;

diagnosing by the engine control unit, based on the output signal from the fuel pressure sensor, whether or not abnormality occurs in a control of the fuel pressure;

judging by the engine control unit, based on the diagnostic signal, whether or not the abnormality occurs in the input of the actuating signal in the fuel pump control unit; and performing a fail-safe function by the engine control unit, based on whether or not the abnormality occurs in the input of the diagnostic signal, whether or not the abnormality occurs in the control of the fuel pressure, and whether or not the abnormality occurs in the input of the actuating signal in the fuel pump control unit.

15. The method according to claim 14, further comprising the step of;

constantly fixing the manipulated variable by the fuel pump control unit when the abnormality occurs in the input of the actuating signal.

16. The method according to claim 14, wherein the step of performing the fail-safe function includes the step of:

inhibiting engine operations in a high load-high rotation region, as the fail-safe function, when the input of the diagnostic signal is normally performed and the abnormality occurs in the input of the actuating signal.

17. The method to claim 14, wherein the step of performing the fail-safe function includes the step of:

inhibiting engine operations in a high load-high rotation region and controlling the fuel pressure in a region lower than normal by setting the actuating signal, as the fail-safe function, when abnormality occurs in a pressure increasing control, as the abnormality in the fuel pressure control.

18. The method according to claim 14, wherein the step of performing the fail-safe function includes the step of:

inhibiting engine operations in a low air amount region, as the fail-safe function, when abnormality occurs in a pressure decreasing control, as the abnormality in the fuel pressure control.

19. The method according to claim 14, wherein the step of performing the fail-safe function includes the step of:

outputting normally the actuating signal and controlling normally the engine, when the abnormality occurs in the input of the diagnostic signal, and the fuel pressure control is normally performed.

20. The method according to claim 14, wherein the step of performing the fail-safe function includes the steps of:

inhibiting engine operations in a high load-high rotation region, as the fail-safe function, when the input of the diagnostic signal is normally performed and the abnormality occurs in the input of the actuating signal;

inhibiting the engine operations in the high load-high rotation region and controlling the fuel pressure in a region lower than normal by setting the actuating signal, as the fail-safe function, when abnormality occurs in a pressure increasing control, as the abnormality in the fuel pressure control;

inhibiting the engine operations in a low air amount region, as the fail-safe function, when abnormality occurs in a pressure decreasing control, as the abnormality in the fuel pressure control; and outputting normally the actuating signal and controlling normally the engine, when the abnormality occurs in the input of the diagnostic signal, and the fuel pressure control is normally performed.

* * * * *